INVENTOR.
GARRET F. ZIFFER

June 22, 1965 G. F. ZIFFER 3,190,261
CONTROL SYSTEM
Filed Sept. 28, 1960 2 Sheets-Sheet 2

INVENTOR.
GARRET F. ZIFFER
BY
ATTORNEY

United States Patent Office 3,190,261
Patented June 22, 1965

3,190,261
CONTROL SYSTEM
Garret F. Ziffer, Wayland, Mass., assignor, by mesne assignments, to Laboratory for Electronics, Inc., Boston, Mass., a corporation of Delaware
Filed Sept. 28, 1960, Ser. No. 58,940
6 Claims. (Cl. 118—8)

This invention relates in general to process control systems and more particularly to a system for maintaining the proper relationship between a pair of transducers operating on either side of a process operation point.

Automated process control systems are now widely used in industrial plants for maintaining rigid tolerances in the material being processed. Thus, for example, in an industry such as the paper industry where a continuous strip of paper is being manufactured, a transducer is used to determine the thickness of paper and this information is continuously fed back to a point in the process control line where the thickness may be varied. By this technique a desired thickness may be programmed into the control system and the information from the transducer may be then fed back to the control point to maintain the thickness at or very close to this value. The essential elements of such a system are a transducer to measure the variable being controlled, a comparator element to continuously compare the transducer output to a predetermined standard, a correction signal generator to generate a correction signal representative of the difference between the transducer output and the predetermined standard, and a control element responsive to the correction signal, which acts directly on the process material to physically affect the variable.

A somewhat more complex system is required when the processing operation to be controlled is one involving a modification of the process material such that transducers must be used to measure the material before and after the modifying process. A typical example would be the application of a coating to paper, where the thickness of the paper is measured before the coating operation and after the coating operation, the difference being the thickness of coating applied. In this case the difference between the transducer outputs must be compared to a standard and the correction signal developed applied to the coating element. In determining the difference between the transducer outputs for this purpose, the control system must provide that the compared transducer signals are representative of the same specific area on the process material strip. With a typical transducer, such as a beta thickness gage, the area measured by the transducer at a given time is only a few square inches, whereas the width of the process material strip would typically be several feet. Therefore, it is the usual practice, when measuring the thickness of a process material with a beta gage, to scan the beta gage head across the width of the material strip. Thus in order to correlate signals from a pair of beta gages which are longitudinally spaced apart on a process material strip and where each gage is scanning across the strip, the process control system must provide that the compared signals are derived not only from the same specific area longitudinally on the strip but also from the same position across the width of the strip.

It is therefore a primary object of the present invention to provide a process control system having a pair of transducers, in which signals from the transducers corresponding to substantially identical portions of the process material are compared.

It is another object of the present invention to provide a process control system having a pair of transducers in which the position of the transducers with respect to one another is continuously adjusted to provide signals at a fixed time separation corresponding to substantially identical portions of the process material.

It is still another object of this invention to provide a process control system employing two transducers, in which transducer signals representing substantially the same portion of the process material strip are automatically compared despite variations in speed of the process material flow.

These and other objects and advantages will become apparent from the following detailed description when taken in conjunction with the accompanying drawing in which.

Figure 1:
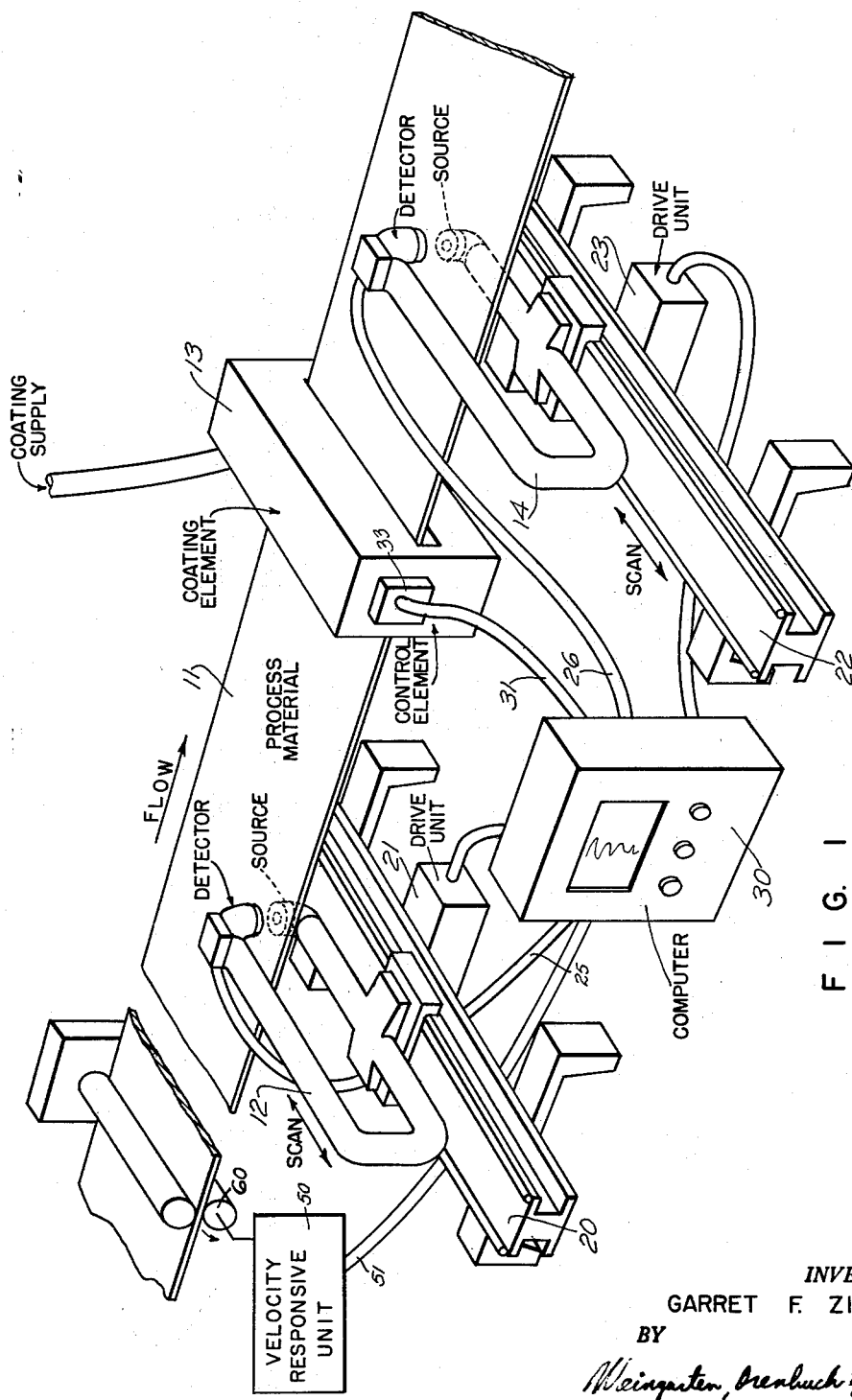
FIG. 1 is a generally perspective view of a process control system in accordance with this invention.

With reference now specifically to FIG. 1, a process material strip 11 is shown flowing through the jaws of a beta gage transducer 12, then through a coating element 13 and through the jaws of a second beta gage transducer 14. Beta gage 12 is slideably mounted on a carrying member 20, which extends transversely across the process material strip. A drive unit 21 is mechanically coupled to the transducer 12 and provides for scanning of the jaws of the transducer across the width of the process material strip 11. Transducer 14 is similarly mounted on carrying member 22 with a similar drive unit 23, permitting it to independently scan across the width of the process material strip 11. The transducer signals from transducers 12 and 14 are coupled through cables 25 and 26 respectively to a computer unit 30. The drive units 21 and 23 also provide signals to computer unit 30, these signals being indicative of the lateral position of each of the transducer units 12 and 14. A velocity responsive unit 50, such as a selsyn motor coupled to an idler roller 60 provides an alternating current indicative of the velocity of the material strip through cable 51 to computer 30. The computer unit provides an output correction signal through cable 31 to a control element 33 on coating element 13. The function of the above described elements is for transducer 12 to measure the thickness of the process material prior to coating and for transducer 14 to measure the thickness after coating, thereby having a measure of the thickness of the coating applied. This measured thickness is then compared to a standard desired thickness of the coating in the computer element and a correction signal is developed and sent to the control element whenever a deviation from the standard thickness of coating is measured. The overall operation is then one of continuing control of the coating thickness.

Figure 2:
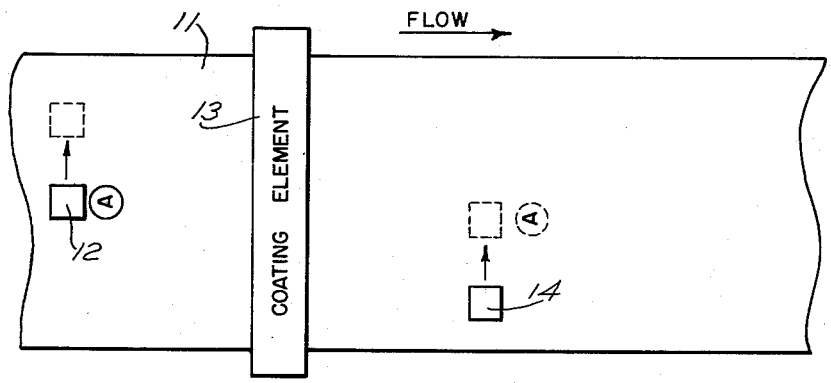
FIG. 2 is a diagrammatic view from above of a process material strip indicating the position at successive points in time of a pair of scanning transducers.

As previously indicated, the process material is flowing in one direction while both transducers are scanning the width of the strip and therefore moving in a direction normal to the direction of flow of the process material. In order then for the difference in transducer signals to be representative of the thickness of coating occurring at element 13, the transducer signals used to obtain this difference must represent the same specific point on the process material, since the thickness of the material may vary across the width of the strip. Referring now to FIG. 2, the position of transducers 12 and 14 with respect to a point A on the process control strip is diagrammatically illustrated. The positions indicated by the solid lines correspond to a time $T_1$ and those positions indicated by the dotted lines correspond to a $T_2$. The separation between $T_1$ and $T_2$ is an interval $\tau$, which is the time required for point A to move from the longitudinal position of transducer 12 to the longitudinal position of transducer 14.

Thus if the signal from transducer 12 at time $T_1$ is representative of the thickness of the material at point A, it is clear that the signal from transducer 14 to be compared must be that which is generated at time $T_2$ and further the position of transducer 14 at time $T_2$ must correspond to the lateral position of transducer 12 at time $T_1$. If this latter characteristic is to be provided by maintaining a fixed displacement in the scan position between transducers 12 and 14, then not only must the scanning velocities of 12 and 14 be identical, but also the velocity of flow of the material must be maintained constant. To provide these fixed relationships in the circumstances of industrial gaging and processing is extremely difficult and, of course, slight differences in the scanning velocity of the two transducers may have a cumulative effect, thereby increasing the error with the number of scans.

Figure 3:
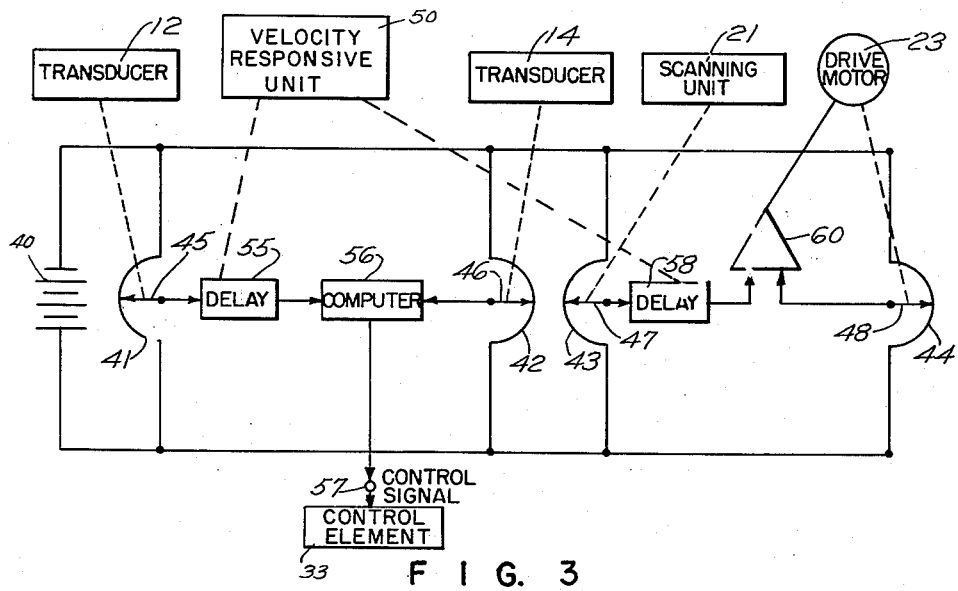
FIG. 3 is an illustration partly in block diagrammatic and partly in schematic form of a control circuit embodying the principles of this invention.

Broadly speaking, the present invention provides a system employing a servo-mechanical technique to maintain dynamically the desired relation between transducers 12 and 14 and a circuit which provides for comparison of transducer signals corresponding to the same point on the process material strip. The signals from transducer 14 are compared to the signals from transducer 12 which were generated at interval $\tau$ earlier, where $\tau$ is continuously adjusted to compensate for variations in velocity of the flow of the process material. The servo-mechanical system controls the scanning position of transducer 14 such that it occupies at any given time the same lateral position on the strip width which was occupied by transducer 12 $\tau$ seconds earlier. The interval $\tau$ in this case is again adjusted continuously to compensate for variations in the flow of materials. FIG. 3 is an illustration in block diagrammatic form of the circuit and servo-mechanical system for accomplishing these functions. A direct current voltage source 40 has four slidewire potentiometers 41, 42, 43 and 44 respectively connected in parallel across it. Movable arm 45 of slidewire 41 is mechanically linked to the movable arm of a slidewire (not shown) within transducer 12, so that the position of arm 45 on potentiometer 41 varies in proportion to the variance of signal output from transducer 12. Arm 45 is electrically connected to delay unit 55 which serves to delay the input signal for a period of time $\tau$ and the output signal from this delay unit 55 is provided to one input of computer unit 56. Movable arm 46 of slidewire 42 is mechanically coupled to the movable arm of a slidewire (not shown) within transducer 14 in a similar manner so that the position of arm 46 on slidewire 42 is indicative of the signal output from transducer 14. This movable arm 46 is electrically connected directly to a second input of computer unit 56. Computer unit 56 provides an output signal at 57 corresponding to the difference between its two input signals; hence the output at 57 represents the difference between the transducer signal 12 and the transducer signal 14 at a time $\tau$ seconds later. Output 57 then serves as a control signal for a control element 33 which may be used to provide corrections at a processing operational point, such as a coating element as indicated in FIG. 1.

The movable arm 47 of slidewire potentiometer 43 is mechanically coupled to scanning drive unit 21, which serves to drive transducer unit 12 and hence the position of this movable arm on the potentiometer is indicative of the lateral position of transducer 12. Arm 47 is electrically connected to the input of the delay unit 58 which delays the signal on arm 47 for a period of time $\tau$. The output of delay unit 58 is provided to one input of balancing amplifier 60. Movable arm 48 on potentiometer 44 is mechanically coupled to drive unit 23 which serves to control the lateral position of transducer 14 and electrically connected to the second input of balance amplifier 60. The output of amplifier 60 is provided to drive unit 23 and serves to energize this drive unit. The overall operation of potentiometer 44, balancing amplifier 60 and drive unit 23 is then that whenever there is an imbalance in amplifier 60, an energizing signal is provided to unit 23, having a polarity indicative of the direction of imbalance at the input of amplifier 60 and the drive unit then moves the transducer 14 and simultaneously varies the position of arm 48 on slidewire potentiometer 44 in a manner corresponding to the movement of transducer 14. Thus the drive unit remains energized until the amplifier 60 inputs are balanced. The effect of this operation is then that drive unit 23 drives transducer 14 to a position which is the same as the lateral position of transducer 12 a period of time $\tau$ previously. Delay unit 55 then provides that the transducer signals compared on computer 56 represent the same point along the length of the process material strip, while the drive unit controls, which position the transducer 14 laterally, provide that the signals compared in computer 56 are derived from the same point across the width of the process material strip.

As previously indicated, the velocity of the flow of the process material may vary from time to time and it is therefore desirable that delays 55 and 58 do not provide a constant delay, but rather provide a delay which is automatically adjusted to compensate for these velocity variations. A delay which varies with the speed of the flow of process material may be accomplished in a variety of ways. A suitable method is to provide a recording head and detector head separated by a predetermined distance with a continuously moving tape running between them. The input signals are then recorded on the tape at the recording head and detected at the detector head which then provides them as an output signal, the time spacing between input and output being that time which it takes the tape to travel from the recorder to the detector head. The speed of travel of the tape may be varied proportionally to the speed of the process material flow by means of a velocity responsive means 50, such as selsyn motors or the like. The computer unit 56 may be any unit capable of accepting two independent input signals and providing an output representing the voltage difference between the input signals, a typical example being a bridge network.

It should be understood that the above described system does not provide for exact identity of location of the transducers on the process material strip under all conditions. For example, in the extreme case where a discontinuity in flow causes transducer 12 to scan one half the width while the flow velocity is zero, transducer 14 cannot repeat these positions after the flow velocity has reached a positive value. Even in the usual case where variations are relatively small, some error is introduced since the appropriate delay time for each specific area of material cannot be determined until the area is at the transducer 14 position, and a finite period of time is required for the transducer to position itself. This latter type of error will, however, be small where the variations are small and the time required to position the transducer is short in comparison to the measuring time constant. In the case of large variations, the error introduced will be corrected when the velocity stabilizes; hence there is no cumulative effect. In general control systems operate to correct for long term trends and these errors become insignificant in relation to such long term corrections. The above described system also provides ease of operation where the scan programming of transducer 12 is complex with reversals, dwelling and the like, since transducer 14 will automatically follow this pattern without independent programming.

While the invention has been described in terms of an embodiment applied to a processing system where the intermediate operation is a coating operation, it is apparent that it is equally applicable to any system employing scanning transducers measuring some physical variable before and after a process operation. Having described the invention herein, it is apparent that many modifications and improvements may now be made by those skilled in the art and it is intended that the invention disclosed herein should be limited only by the spirit and scope of the appended claims.

What is claimed is:

1. Apparatus for controlling a processing element adapted to effect a change in a physical characteristic of a continuously moving material strip comprising, a first transducer located upstream of said processing element and adapted to provide as an output a signal indicative of the value of said physical characteristic in the region adjacent to said first transducer; a second transducer located downstream of said processing element and adapted to provide as an output a signal indicative of the value of said physical characteristic in the region adjacent to said second transducer; a first delay unit having its input coupled to the output of said first transducer and adapted to provide as an output said first transducer output signals after a time delay equal to the time required for said material strip to travel from said first to said second transducer; a signal generator coupled to said second transducer output and said delay unit output and adapted to provide an output signal related to the difference between signals from said second transducer output and said first delay unit output; means coupling said signal generator output to said processing element; first drive means for scanning said first transducer transversely across said material strip; second drive means for scanning said second transducer transversely across said material strip; first position indicating means associated with said first transducer and adapted to provide continuously a signal indicative of the transverse position of said first transducer; second position indicating means associated with said second transducer and adapted to provide continuously a signal indicative of the transverse position of said second transducer; a second delay unit coupled to said first position indicating means and adapted to provide as an output said signals from said first position indicating means after a time delay equal to the time required for said material strip to travel from said first to said second transducer; a balancing amplifier coupled to the output of said second delay unit and said second position indicating means and adapted to provide an output whenever said second delay unit output is different from said second position indicating signal; said second drive means being responsive to said balancing amplifier output to drive said second transducer to occupy substantially the same transverse position that said first transducer occupied one delay period previously.

2. Apparatus for controlling a processing element adapted to effect a change in a physical characteristic of a continuously moving material strip comprising, a first transducer located upstream of said processing element and adapted to provide as an output signals indicative of said physical characteristic in the region adjacent to said first transducer; a second transducer located downstream from said processing element and adapted to provide as an output signals indicative of said physical characteristic in the region adjacent to said second transducer; a first delay unit coupled to said first transducer and adapted to provide as an output signals from said first transducer after a time delay equal to the time required for said material strip to travel from said first to said second transducer; signal generator means coupled to the output of said first delay unit and said second transducer output and adapted to provide as an output a signal related to the difference between the output of said first delay unit and said second transducer unit; a first drive means for scanning said first transducer transversely across said material strip; a second drive means for scanning said second transducer transversely across said material strip; a voltage source; a first slidewire potentiometer having a movable arm, said first slidewire potentiometer being coupled across said voltage source, the position of said movable arm on said slidewire being related to the transverse position of said first transducer; a second slidewire potentiometer having a movable arm, said second slidewire being coupled across said voltage source, the position of said second slidewire movable arm being related to the transverse position of said second transducer; a second delay unit electrically coupled to said first slidewire potentiometer movable arm and adapted to provide as an output the signals from said first slidewire movable arm after a time delay equal to the delay of said first delay unit; a balancing amplifier having first and second input terminals and adapted to provide an output in response to any imbalance of signals between said first and said second input terminals, said first input terminal being coupled to the output of said second delay unit, said second input terminal being coupled electrically to said second slidewire movable arm; said second drive means being responsive to the output from said balancing amplifier, whereby said second transducer's transverse position is related to the previous transverse position of said first transducer; means responsive to the output from said signal generator and adapted to control said processing element.

3. Apparatus for controlling a processing element adapted to effect a change in a physical characteristic of a continuously moving material strip comprising, a first transducer loaded upstream of said processing element and adapted to provide as an output signals indicative of the variation of said physical characteristic in the region adjacent to said first transducer; a second transducer located downstream of said processing element and adapted to provide as an output signals indicative of the variation in said physical characteristic in the region adjacent to said second transducer; a first delay unit coupled to the output of said first transducer and adapted to provide as an output the signals from said first transducer after a time delay equal to the time required for said material strip to travel from said first to said second transducer; means for determining the velocity of flow of said material strip from said first transducer to said second transducer, said velocity measuring means being adapted to provide output signals indicative of the variation of said velocity; means for varying the delay time of said first delay unit in a manner related to variation in output signals from said velocity measuring means; signal generator means coupled to the output of said first delay unit and the output of said second transducer, said signal generator being adapted to provide as an output signals related to the difference between the output of said first delay unit and the output of said second transducer; a first drive means for scanning said first transducer transversely across the material strip; a second drive means for scanning said second transducer transversely across said material strip; a first position indicator providing continuously as an output a signal indicative of the transverse position of said first transducer; a second position indicator providing continuously as an output a signal representative of the transverse position of said second transducer; a second delay unit coupled to said first position indicator and adapted to provide as an output said signals from said first position indicator after a time delay having a duration related to the output from said velocity measuring means; a balancing amplifier having first and second inputs and adapted to provide an output signal indicative of the difference between signals on said first and said second inputs, said first input being coupled to the output of said second delay unit, said second input being coupled to the output of said second position indicating means; said second drive means being responsive to the output from said balancing amplifier, whereby the transverse position of said second transducer is related to the previous transverse position of said first transducer; control means responsive to the output from said signal generator and adapted to provide control of said processing element in accordance with variations in said signal generator output.

4. Apparatus for controlling a coating process on a continuously moving material strip comprising, a coating element disposed adjacent to said material strip and adapted to apply a coating material to said strip; a first beta thickness gauge disposed upstream of said coating element and adapted to provide as an output a signal indicative of the variations in thickness of said material strip in the region adjacent to said first beta thickness gauge; a second beta thickness gauge disposed downstream of said coating element and adapted to provide as an output signals indicative of the variations in thickness of said coated material strip in the region adjacent to said second beta thickness gauge; a voltage source; a first slidewire potentiometer coupled across said voltage source, said first slidewire potentiometer having a movable arm, the position of said first slidewire movable arm being related to the output signals from said first beta thickness gauge; a second slidewire potentiometer coupled across said voltage source, said second slidewire potentiometer having a movable arm, the position of said second slidewire movable arm being related to the output signals from said second beta thickness gauge; a first delay unit electrically coupled to said first slidewire movable arm and adapted to provide as an output the voltage on said movable arm after a time delay equal to the time required for said material strip to flow from said first beta thickness gauge to said second beta thickness gauge; a signal generator electrically coupled to the output of said first delay unit and to said second slidewire movable arm, said signal generator being adapted to provide as an output signals indicative of the difference between the voltage from said first delay unit and the voltage from said second slidewire movable arm; a control element responsive to the output from said signal generator and adapted to control said coating element to vary the thickness of coating applied to said material strip in accordance with the output of said signal generator; first drive means adapted to scan said first beta thickness gauge transversely across said material strip; a second drive means adapted to scan said second beta thickness gauge transversely across said material strip; a third slidewire potentiometer coupled across said voltage source, said third slidewire potentiometer having a movable arm, the position of said third slidewire movable arm being related to the transverse position of said first beta thickness gauge; a fourth slidewire potentiometer coupled across said voltage source, said fourth slidewire having a movable arm, the position of said fourth slidewire movable arm being related to the transverse position of said second beta thickness gauge; a second delay unit coupled electrically to said third slidewire movable arm and adapted to provide as an output the voltage from said third slidewire movable arm after a time delay substantially equal to the time delay of said first delay unit; a balancing amplifier having first and second inputs and adapted to provide an output signal indicative of the magnitude and direction of difference in voltage between said first and said second inputs, said first input of said balancing amplifier being coupled to the output of said second delay unit, said second input of said balancing amplifier being coupled electrically to said fourth slidewire movable arm; said second drive means being responsive to said output from said balancing amplifier, whereby the transverse position of said second beta thickness gauge is related to the previous transverse position of said first beta thickness gauge.

5. Apparatus for controlling a processing element adapted to effect a change in a physical characteristic of a continuously moving material strip comprising a first transducer located upstream of said processing element and adapted to provide as an output a signal indicative of the value of said physical characteristic in the region adjacent to said first transducer; a second transducer located downstream of said processing element and adapted to provide as an output a signal indicative of the value of said physical characteristic in the region adjacent to said second transducer; first scan means for scanning said first transducer in a transverse path across said material strip; second scan means for scanning said second transducer in a transverse path across said material strip; means for comparing output signals from said first transducer indicative of said physical characteristic in a portion of said material stream with output signals from said second transducer indicative of said physical characteristic of the same portion of said material strip and controlling said processing element in accordance with the difference between said signals.

6. Apparatus for controlling a processing element adapted to effect a change in a physical characteristic of a continuously moving material strip comprising a first transducer located upstream of said processing element and adapted to provide as an output signals indicative of variations in said physical characteristic of said material strip in the region adjacent to said first transducer; a second transducer located downstream of said processing element and adapted to provide as an output signals indicative of variations in said physical characteristic of said material strip in the region adjacent to said second transducer; first drive means for scanning said first transducer in a transverse path across said material strip; second drive means for scanning said second transducer in a transverse path across said material strip, means providing that for each increment of said material strip arriving at said second transducer transverse path, said second transducer occupies substantially the same transverse position occupied by said first transducer when said increment arrived at said first transducer transverse path; means for providing a signal characteristic of the deviation between said first transducer output signal for said increment and said second transducer output signal for said increment; control means responsive to said signal characteristic of said deviation for controlling said processing element.

References Cited by the Examiner
UNITED STATES PATENTS

| | | | |
|---|---|---|---|
| 2,750,986 | 9/56 | Russell et al. | 118—9 XR |
| 2,793,345 | 5/57 | Hags | 250—83.4 |
| 2,797,171 | 6/57 | Fralish | 118—9 XR |
| 2,883,895 | 4/59 | Vossberg. | |
| 2,909,660 | 10/59 | Alexander. | |
| 2,988,641 | 5/61 | Gough | 250—83.4 |

RICHARD D. NEVIUS, *Primary Examiner.*